UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN & ANILINFARBENFABRIK, OF OFFENBACH-ON-THE-MAIN, GERMANY.

BLUE AZO WOOL DYE AND PROCESS OF MAKING SAME.

No. 798,808.          Specification of Letters Patent.          Patented Sept. 5, 1905.

Application filed April 13, 1905. Serial No. 255,473. (Specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented certain new and useful Improvements in Azo Dyes for Wool, of which the following is a specification.

My invention relates to the production of a new dyestuff by combining the diazotized 6-nitro-2-amidophenol-4-sulfonic acid with beta-oxynaphtoic acid of the fusing-point of 216° centigrade.

The new dyestuff yields on wool, even when dyed in a proportion of only two per cent., an indigo blue which is of a particular value because of its greenish shade and its brightness when looking over the hand.

In the following example I shall illustrate the nature of my invention and how it may be carried out: Sixty-four parts of 6-nitro-2-amido-phenol-4-sulfonic acid (sodium salt) are dissolved in water and diazotized by means of one hundred and ten parts of hydrochloric acid of 20° Baumé and 17.5 parts of sodium nitrite at about 10° centigrade. The diazo solution is poured into a cold solution of fifty parts of beta-oxynaphtoic acid of the fusing-point of 216° centigrade, nine hundred parts of water, and forty parts of sodium lye, 35° Baumé, to which seventy-five parts of soda have been added. After the combination is completed the whole is heated up to 70° centigrade and the dyestuff then precipitated by adding common salt and some hydrochloric acid. After drying it represents a black-brown powder dissolving in water to a violet solution and in concentrated sulfuric acid to a bluish-red one. On adding hydrochloric acid the aqueous solution turns into a yellowish red, whereas sodium lye it renders bluish red.

Besides its beautiful shade, the new dyestuff is distinguished by the valuable property that it leaves the cotton-effect threads absolutely undyed and that its shade is not altered by artificial light.

Now what I claim, and desire to secure by Letters Patent, is the following:

1. The process of producing an azo dye for wool, consisting in combining diazotized 6-nitro-2-amidophenol-4-sulfonic acid with beta-oxynaphtoic acid of the fusing-point of 216° centigrade.

2. As a new article the coloring-matter, which results from the combination of diazotized 6-nitro-2-amidophenol-4-sulfonic acid with beta-oxynaphtoic acid of the fusing-point of 216° centigrade, the alkali salt of which forms a blackish-brown powder, dissolves in concentrated sulfuric acid to a bluish red in water to a violet solution, turning into a yellowish red on adding hydrochloric acid, while simultaneously separating the dyestuff as a flocky precipitate, and being rendered bluish red by sodium lye, all substantially as hereinbefore described.

In testimony that I claim the foregoing as my invention I have signed my name, in presence of two witnesses, this 31st day of March, 1905.

AUGUST LEOPOLD LASKA.

Witnesses:
    HEINRICH NEUENHAUS,
    HERMAN WEIL.